United States Patent [19]

Lohmann et al.

[11] Patent Number: 5,658,484
[45] Date of Patent: Aug. 19, 1997

[54] AGENTS AND A PROCESS FOR WATERPROOFING LEATHERS AND FURS

[75] Inventors: Helmut Lohmann, Krefeld; Wolfgang Hübner, Kempen; Leonardus Strijbos, Tönisvorst; Waldemar Inger, Krefeld, all of Germany

[73] Assignee: Chemische Fabrik Stockhausen GmbH, Krefeld, Germany

[21] Appl. No.: 751,417

[22] Filed: Nov. 18, 1996

Related U.S. Application Data

[63] Continuation of Ser. No. 429,242, Apr. 25, 1995, abandoned.

[30] Foreign Application Priority Data

Apr. 29, 1994 [DE] Germany .................. 44 15 062.8

[51] Int. Cl.$^6$ .................. C14C 9/00; C14C 9/02; C14B 3/00; C09K 3/18
[52] U.S. Cl. .................. 252/8.57; 106/2; 106/287.1; 8/94.1 R; 8/94.14; 8/94.23; 8/94.33; 427/389
[58] Field of Search .................. 8/94.1 R, 94.14, 8/94.23, 94.33; 106/2, 287.11, 287.12, 287.13, 287.14, 287.15, 287.16; 252/8.57; 427/389

[56] References Cited

U.S. PATENT DOCUMENTS

| | | | |
|---|---|---|---|
| 2,798,858 | 7/1957 | Brown et al. ............... | 524/837 |
| 2,964,425 | 12/1960 | Holzinger et al. .............. | 428/289 |
| 3,494,977 | 2/1970 | Heit et al. ................... | 525/478 |
| 4,065,258 | 12/1977 | France ......................... | 8/142 |
| 4,380,503 | 4/1983 | Koerner et al. ................ | 252/314 |
| 4,388,437 | 6/1983 | Ona ............................ | 106/287.12 |
| 4,509,981 | 4/1985 | Sanders, Jr. et al. ........... | 106/287.13 |
| 4,518,727 | 5/1985 | Traver ......................... | 106/287.13 |
| 4,615,738 | 10/1986 | Sanders, Jr. et al. ........... | 106/2 |
| 4,701,269 | 10/1987 | Bay et al. ..................... | 252/8.57 |
| 4,757,106 | 7/1988 | Mayer et al. ................... | 106/287.14 |
| 4,778,624 | 10/1988 | Ohashi et al. .................. | 106/287.14 |
| 4,814,376 | 3/1989 | Tanaka et al. .................. | 106/287.13 |
| 4,931,062 | 6/1990 | Bay et al. ..................... | 8/94.23 |
| 5,017,221 | 5/1991 | Legrow et al. .................. | 106/2 |
| 5,080,811 | 1/1992 | Bruckemann et al. .............. | 252/8.6 |
| 5,133,897 | 7/1992 | Balzer ......................... | 106/287.14 |
| 5,175,360 | 12/1992 | Fried .......................... | 562/538 |
| 5,180,584 | 1/1993 | Sebag et al. ................... | 424/401 |
| 5,226,923 | 7/1993 | O'Lenick, Jr. .................. | 252/8.57 |
| 5,226,954 | 7/1993 | Suzuki ......................... | 106/287.14 |
| 5,268,126 | 12/1993 | Balzer ......................... | 106/287.14 |
| 5,302,658 | 4/1994 | Gee et al. ..................... | 106/287.14 |
| 5,433,753 | 7/1995 | Dahmen et al. .................. | 252/8.57 |

FOREIGN PATENT DOCUMENTS

| | | |
|---|---|---|
| 1260795 | 9/1989 | Canada . |
| 280152 | 8/1988 | European Pat. Off. . |
| 344442 | 12/1989 | European Pat. Off. . |
| 418479 | 3/1991 | European Pat. Off. . |
| 2-449085 | 4/1976 | Germany .................. 106/2 |
| 4224362 | 1/1994 | Germany . |
| 58-057459 | 4/1983 | Japan .................. 106/287.1 |
| 63-013167 | 11/1994 | Japan .................. 106/287.14 |
| 1523678 | 9/1978 | United Kingdom . |

OTHER PUBLICATIONS

Product Information Sheet for Akypo polyglycol ether carboxylic acids, Chemische Fabrik Chem–Y GmbH, pp. 1–4. (no date).
Abstract of Published German Patent Application No. DE 1,444,986 (May 1969).
Abstract of Published German Patent Application No. DE 4,224,362. (Jan. 1994).
Abstract of Published German Application No. 2,219,806 (Oct. 1973).
Abstract of Published European Application No. 213,480 (Mar. 1987).

*Primary Examiner*—Anthony Green
*Attorney, Agent, or Firm*—Evenson, McKeown Edwards & Lenahan P.L.L.C.

[57] ABSTRACT

The present invention relates to anhydrous and water-containing agents for waterproofing leathers and furs, which comprise a silicone and as emulsifier an alkyl polyalkylol ether carboxylic acid and/or an alkylaryl polyalkylol ether carboxylic acid and/or one of their alkali, alkaline earth, ammonia, amine, or alkanolamine salts. The present invention further relates to the use of these agents for waterproofing, preferably in retanning or afterwards. Subsequent to the waterproofing, an aftertreatment using metallic salts of bito tetravalent cations may be carried out.

21 Claims, No Drawings

AGENTS AND A PROCESS FOR WATERPROOFING LEATHERS AND FURS

This application is a continuation of application Ser. No. 08/429,242 filed on Apr. 25, 1995 and now abandoned.

The present invention relate to agent or waterproofing leathers and furs, which comprise at least one silicone and as an emulsifier for the silicone alkyl and/or alkylaryl polyalkylol ether carboxylic acids and/or their derivatives, in particular their alkali, alkaline earth, ammonia, amine, and/or alkanolamine salts. The present invention further relates to the use of these agents in the leather and fur manufacture, in particular for waterproofing.

Agents and procedures to improve leather and fur properties by reducing the water absorption and permeability with a simultaneous permeability to water vapor have been known for some time, in particular those using silicones as waterproofing agents. U.S. Pat. No. 2,798,858 describes a process wherein water-repellent leathers are produced with aqueous emulsions of silicones and metallic salts, preferably with zirconium acetate; diols are used as additives to stabilize the emulsion and to promote the penetration of the silicone oil.

DE-AS 14 44 986 describes the treatment of leathers with water-soluble reaction products formed of aminosiloxanes and hydroxyl group-containing dimethylsiloxanes; however, it is necessary to aftertreat the dry leather with silicones dissolved in organic solvents.

DE-OS 19 15 482 describes a process for impregnating leathers with copolymers of aminoalkyl- and dimethylsiloxanes and polydimethylsiloxanes; these are present either dissolved in organic solvents or in aqueous dispersion. U.S. Pat. No. 4,065,258 describes the use of epoxide-containing silicones in solvents for the leather treatment in dry cleaning.

EP 0 055 606 A1 and EP 0 200 916 B1 describe aqueous emulsions of silicones manufactured by using known surfactants or by combining nonionic emulsifiers having HLB-values of more than 13 and more than 16. Since these emulsifiers have hydrophilic and wetting properties and are not incorporated into the materials by other treatment procedures, they impair the desired hydrophobic properties of the leathers and furs.

For this reason, DE-OS 25 55 048 and DE 30 24 870 C1 describe processes for the production of silicone and paraffin emulsions which are produced from gel-like mixtures under the action of strong shearing forces but also by using oxalkylates.

EP 0 213 480 B1 describes a waterproofing process wherein the salt of an $N(C_9-C_{20}$-acyl)-amino acid is used as emulsifier for silicone oil, in particular for a silicone oil functionalized by mercapto groups.

According to U.S. Pat No 2,964,425 and DE-OS 22 19 806, $N(C_9-C_{20}$-acyl)-amino acids and their salts themselves are known as fat-liquors and greases and for the finishing of hydrophobic leathers and furs.

When these emulsifiers are used, in particular at liquor pH values of below 4.5, a poor stability of the dispersion state of the treatment bath is to be observed, resulting in an uneven distribution of the hydrophobing component and in impeded handling of the liquor. One reason for these disturbances may lie in the insufficient hydrolytic resistance of the mentioned emulsifying agents.

According to another development described in EP 0 324 345 B1, a process is known wherein polysiloxanes are used which are functionalized by neutralized carboxyl groups, i.e., without emulsifiers, and wherein additionally the metallic salt fixation in the after-treatment is omitted. However, exclusively using these modified silicones is disadvantageous for economic considerations.

DE 39 28 978 A1 describes ethoxylated fatty acid amides acting as softening agents for textiles in admixture with silicones. However, they are ineffective for the waterproofing of leather.

Alkyl-(aryl)-polyalkylol ether carboxylic acids and their salts are known as surfactants. EP 0 488 467 A2 describes a production method providing high yields of polyalkylol ether carboxylic acids. DE 42 24 362 A1 describes a process for the production of these substances under reduction of the residual polyglycol ether content; it further describes the use of these surfactants as additive in the production of detergents, rinsing and cleaning agents and in the manufacture of personal hygiene and cleansing products. For instance, EP 440 542 B1 describes washing compositions that consist of the mentioned compounds and volatile and nonvolatile silicones as well as anionic, zwitterionic, nonionic, hydrophilic agents, and which are present as shampoos, washing creams or shower gels. In addition, these surfactants are proposed for the manufacture of cosmetic and pharmaceutic preparations; as wetting and dyeing auxiliary agents; as additive in coolants, plastics and cold cleaners; for the use in emulsion polymerization, and as additive to flooding media in the tertiary oil recovery. In addition to hardness stability and lime dispersive power, they have lowfoaming properties when used as emulsifiers for metal working fluids, and the disadvantages to be observed when fatty acids and silicones are used as defoamers do not occur.

Accordingly, it is the object of the present invention to overcome the problems occurring in the waterproofing of leathers and furs using silicone oil-containing agents, such as deficient stability of the state of dispersion, in particular at low pH values; in this connection a more even and thus improved waterproofing is achieved by improving the state of dispersion, in particular at pH-values of below 4.5.

This object is achieved by preparations for the waterproofing of leathers and furs, namely both anhydrous and aqueous ones, which comprise as emulsifier for the silicone at least one alkyl polyalkylol ether carboxylic acid and/or alkylaryl polyalkylol ether carboxylic acid and/or one of their derivatives, preferably an alkali, alkaline earth, ammonia, amine, and/or alkanolamine salt. These emulsifiers according to the present invention provide emulsions of silicone oil which are stable in water or aqueous media. Their properties can advantageously be used under the conditions of the leather and fur production, in particular in the waterproofing of these materials.

Accordingly, the subject matter of the present invention relates to agents for the waterproofing of leathers and furs, comprising at least one silicone and at least one emulsifier, which are characterized in that they comprise as emulsifier at least one alkyl polyalkylol ether carboxylic acid and/or alkylaryl polyalkylol ether carboxylic acid and/or an alkali, alkaline earth, ammonia, amine, or alkanolamine salt of these carboxylic acids.

The alkyl and/or alkylaryl polyalkylol ether carboxylic acids to be used according to the present invention correspond to the formula

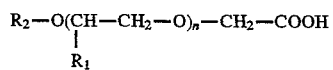

wherein $R_1$ represents H, $CH_3$, and $R_2$ represents an n- or iso-alkyl residue having 9 to 30 C-atoms, preferably 12 to 22 C-atoms, which may optionally comprise one or several olefinic groups, an alkylaryl residue or dialkylaryl residue, preferably consisting of a dialkylphenyl group having alkyl residues with 6 to 10 C-atoms, preferably 8 and/or 9 C-atoms and n represents a numerical value of 1 to 20, preferably 1 to 8, and most preferably 1.5 to 6.

It is preferred that fatty alcohol polyalkylol ether carboxylic acids having 12–22 C-atoms in the alkyl group and 1.5–6 glycol units be used.

The use of the alkyl and/or alkylaryl polyalkylol ether carboxylic acids and/or their salts may—in addition to waterproofing—also be effected in other steps during the production process for leathers and furs and in other product forms thereof. For instance, they may be used as fat-liquors and greases for leather to improve the softness and grain tightness. The alkyl and alkylaryl polyalkylol ether carboxylic acids are used as acids and/or as derivatives, in particular as salts, with alkali, ammonium, alkaline earth, alkylamine, and polyalkylamine, and/or mono-, di- or trialkanolamine salts, such as mono-, di-, or triethanolamine salts being employed.

Preferably, the polyglycol ether carboxylic acids which are liquid at room temperature and have di- and triglycol units of lauric, oleyl alcohol and of stearyl alcohol, and/or their salts are used. Particularly preferred are the alkyl polyalkylol ether carboxylic acids which are liquid at room temperature and those having a HLB-value of below 10. Also preferred are alkyl or alkylaryl polyalkylol ether carboxylic acids and/or their derivatives having an only low content of hydrophilic accompanying substances, such as polyalkylols, for example, those stated in DE 42 24 362 A1 such as a fatty alcohol polyglycol ether of the formula

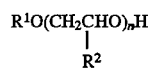

wherein $R^1$ is a 6 to 22 carbon aliphatic hydrocarbyl containing 0 to 3 double bonds; $R^2$ is H or $CH_3$; and n is 1 to 20.

Commercial liquid silicones, such as polydimethylsiloxane, cyclic and low-molecular polysiloxanes, and their mixtures are used as silicone oils. The viscosity of the silicones should be in the range of 20 to 2,000 mPas, preferably in the range of 20 to 500 mPas.

In addition, silicones which are modified by organofunctional groups, such as amino, hydroxy, mercapto, and/or carboxyl groups, are also used according to the present invention, either alone or together with the already mentioned silicones.

The anhydrous agents according to the present invention comprise 10 to 95%-wt. of silicone oil and 5 to 90%-wt. of alkyl and/or alkylaryl polyalkylol ether carboxylic acids and/or their salts.

However, an aqueous, in particular concentrated emulsion is preferred which comprises a) 10 to 90%-wt. of silicone oil and b) 5 to 30%-wt. of alkyl and/or alkylaryl polyalkylol ether carboxylic acids and/or their salts, and at least 5%-wt. or-supplementary to the amount of portions a) and b)—up to 100%-wt. of water. The pH of the aqueous emulsion may, optionally by the addition of bases, be adjusted to values in the range of 4 to 12, preferably to pH 5 to 9, using alkali and alkaline earth hydroxides, ammonia, amines, and alkanolamines, in particular potassium hydroxide solution, sodium hydroxide solution, and monoethanolamine.

The anhydrous preparations and aqueous emulsions according to the present invention may additionally comprise further components, such as anionic fat liquors and greases and/or other hydrophobing portions, such as liquid or solid hydrocarbons, for example, paraffins, white oils and mineral oils; and/or natural oils and/or natural and synthetic waxes; chloroparaffins, and/or fatty acid esters, for example, ester oils and fatty acid polyol esters as well as oxidized paraffins.

The anhydrous agents and aqueous emulsions may also comprise other surfactants and emulsifiers, in particular nonionic emulsifiers, such as sorbitol and sorbitan fatty acid esters, glycerol fatty acid esters, pentaerythritol-$C_{16}$–$C_{24}$-fatty acid esters and/or their oxalkylates, fatty acid sarcosides, and alkyl polyglycosides, for example, those described in EP 0 418 479 A1 such as alkylpolyglycosides of the formula R—O—$Z_n$ wherein R represents a linear or branched, saturated or unsaturated alkyl radical having 8 to 16 carbon atoms, $Z_n$ represents an alkylolilgoglycoside radical and n is 1 to 5.

The anhydrous agents, and in particular the aqueous emulsions, may additionally comprise polymers and copolymers of hydrophobic monomers, such as alkyl(meth)acrylates, alkyl- or alkoxyphenol polyalkylene oxide(meth)acrylates, alkenes, vinyl esters of alkyl carboxylic acids and their mixtures, and water-soluble monomers, such as unsaturated $C_1$–$C_6$-carboxylic acids, unsaturated $C_2$–$C_6$-dicarboxylic acids and/or their derivatives, in an amount of 0.1–30%-wt., preferably 1–15%-wt.

In order to render the leather and furs waterproof, the anhydrous agents and emulsions are preferably used during retanning or after this production step in aqueous liquor, in an amount of 0.1 to 30.0%-wt., preferably 5.0 to 15%-wt., relative to the shaved weight of the leather or the wet weight of the furs.

The treatment bath is adjusted to pH 3.5 to 8.

The treatment is carried out in known devices at float ratios of 50 to 2,000%, preferably of 80 to 300%, relative to the shaved weight of the leather or wet weight of the furs, under milling the materials at temperatures of 10° to 80° C., preferably at 20° to 60°C.

The period of treatment amounts to up to 2 hours, preferably 60 to 90 minutes.

To complete the waterproofing, the pH of the float is generally adjusted to a value of 3.0 to 4.0 by using organic or mineral acids, normally by means of formic acid.

To intensify the waterproofing effect, an additional after-treatment of the leathers and furs can be effected with 2- to 4-valent metallic salts of the cations of chromium, aluminum, zirconium, and titanium, which are normally used in the tannery and during water-proofing. To this end, 0.5 to 5.0%-wt. of at least one salt is added, relative to the mentioned shaved and wet weights.

It must be pointed out that—in contrast to silicone emulsions based on sarcosides—the dispersion state of the emulsions according to the present invention remains stable even when they are used in aqueous acidic liquors, in particular those containing a higher amount of electrolytes, in the pH-range of up to 3.0, preferably up to 3.5.

In addition elementary, i.e., unmodified siloxane types may be used according to the present invention without changing the state of dispersion of the treatment bath under such conditions.

Owing to the fact that the effects of phase reversal or precipitation do not take place, e.g., when the treatment bath is acidified, quality-reducing deposits of dispersion components on the leather surface are avoided; improved properties of the products are achieved by the improved distribution of the hydrophobing components in the leather or furskins.

The following examples additionally illustrate the present invention; the indications relate to parts by weight.

The pH-values are each measured in 10%-wt. dilution in distilled water.

EXAMPLE 1

Under heating and stirring, 57 parts of a $C_{18}$-alkyl (EO)$_2$-ether carboxylic acid are homogeneously mixed with 15 parts of a polydimethylsiloxane having a viscosity of 350 mPas at 50° C. After addition of 25 parts of water, the pH is adjusted to 6.4 using 3 parts of monoethanolamine. After dilution with water at a ratio of 1:4, the agent having an active substance content of 75%-wt. forms a very stable emulsion.

EXAMPLE 2

15 parts of the $C_{18}$-alkyl (EO)$_2$-ether carboxylic acid are homogeneously mixed under heating to 80° C. with 36.6 parts of a mineral oil having a specific weight of 0.861 g/cm$^3$ at 15° C., a kinematic viscosity of 19 cSt at 40° C. and 3.9 cSt at 100° C., and a boiling range of 310° to 480° C., and with 5.3 parts of a polydimethylsiloxane having a viscosity of 350 mPas; this is slowly added dropwise under intensive stirring to an aqueous phase consisting of 41.3 parts of water and 6.1 parts of a 50%-wt. sodium hydroxide solution. The pH of the emulsion is set to 8.0 to 9.0 by means of sodium hydroxide solution, and the emulsion is cooled to 40° C. under stirring.

EXAMPLE 3

As stated in Example 2, 43 parts of a paraffinic mineral oil having a specific weight of 0.863 g/cm$^3$ (at 15° C.), a kinematic viscosity at 40° C. of 18 cSt and 3.7 cSt at 100° C., and a pour point of −18° C. are added together with 8 parts of a $C_{18}$-alkyl (EO)$_2$-ether carboxylic acid and 5.3 parts of a polydimethylsiloxane having a viscosity of 350 mPas (at 20° C.) into an aqueous phase of 41.3 parts of water and 1.6 parts of a 50% aqueous sodium hydroxide solution. The pH is adjusted to 8.0 to 9.0 with sodium hydroxide solution.

EXAMPLE 4

12.0 parts of a $C_{12}$-alkyl (EO)$_4$-ether carboxylic acid and 5.3 parts of polydimethylsiloxane (viscosity: 350 mPas) are homogeneously mixed in the same manner as in Example 2 with 40 parts of the mineral oil mentioned there and then placed into 42 parts of water with 1.6 parts of 50% sodium hydroxide solution. The pH is adjusted again to 8.0 to 9.0 by means of sodium hydroxide solution.

EXAMPLE 5

8 parts of a $C_{18}$-alkyl (EO)$_2$-ether carboxylic acid are homogeneously mixed with 2 parts of the polydimethylsiloxane (viscosity: 350 mPas) under stirring and heating. The mixture is neutralized by the addition of monoethanolamine and set to a pH in the range of 8.0 to 9.0.

EXAMPLE 6

Procedure as in Example 2; instead of the ether carboxylic acid used there, an emulsion is produced using a $C_{12}$alkyl (EO)$_{2.5}$-ether carboxylic acid.

EXAMPLE 7

Procedure as in Example 2; instead of the ether carboxylic acid used there, an emulsion is produced using a $C_{18}$alkyl (EO)$_5$-ether carboxylic acid.

EXAMPLE 8

Procedure as in Example 2; instead of the ether carboxylic acid used there, an emulsion is produced using a $C_{18}$alkyl (EO)$_2$-ether carboxylic acid.

EXAMPLE 9

Procedure as in Example 2; instead of the ether carboxylic acid used there, an emulsion is produced using a $C_9$-isoalkyl (PO)$_{1.6}$(EO)$_{2.4}$-ether carboxylic acid.

Comparative Example 1

Procedure as in Example 2; instead of the ether carboxylic acid used there, an emulsion is produced using N-oleyl sarcosine.

Comparative Example 2

Procedure as in Example 2; instead of the ether carboxylic acid used there, an emulsion is produced using a $C_{18}$-fatty acid amide(EO)$_3$-ethoxylate.

Application Examples

The indications with respect to the composition of the treatment bath are made in percentage by weight, relative to the shaved weight.

The agents according to the present invention are used for waterproofing leather. Chrome-tanned cattle hides (wet blue) are used which have a shaved substance of 1.8 to 2.0 mm after neutralization, retanning, and dyeing. The leathers are washed in 300%-wt. of water at 60° C. for 10 minutes. After draining off the bath, waterproofing is effected at 60° C. with a float consisting of 100%-wt. of water, 6.0%-wt. of the hydrophobing substance of the agent according to the present invention; this is added in a water dilution ratio of 1:4. The treatment is carried out within 60 minutes. Subsequently, acidification is carried out within 15 minutes using 0.3%-wt. of formic acid which is added in a dilution ratio of 1:5. Afterwards, fixation is effected with 3.0%-wt. Baychrom®A which is added in undissolved form. After another 45 minutes, the bath is drained off and the leather washed twice at 20° C.; this is done for 10 minutes each time using a water quantity of 300%-wt. Then finishing of the leather is carried out: horse-up overnight, samming, setting-out, vacuum drying at 80° C./4 min., conditioning, staking, and milling. The examination in the Bally-Penetrometer is carried out according to DIN 53 338 at an amplitude of 10%. The measured values are listed in the following Table together with the assessment of softness and tightness of grain. The assessment comprises the grades 1 (very good) to 6 (insufficient).

TABLE 1

| Agent of Example | Result of Bally-Test | | Assessment of | |
|---|---|---|---|---|
| | Water penetration time (min.) | Water absorption (%) | Softness | Tightness of grain |
| 1 | >420 | 10 | 2–3 | 1–2 |
| 2 | >420 | 16 | 3 | 1–2 |
| 3 | >420 | 19 | 3 | 1–2 |
| 5 | >420 | 23 | 3 | 2–3 |
| 7 | 55 | 36 | 3 | 2 |
| 8 | >420 | 11 | 3 | 1–2 |
| Comp. Example 1 | >420 | 17 | 3 | 3–4 |
| Comp. Example 2 | 12 | 76 | 3 | 2 |

Stability of the dispersion in electrolyte-containing solution

A portion of the emulsion of Example 2 is dispersed at 60° C. under stirring in 4 parts of a salt solution comprising 30 g of $Na_2SO_4 10H_2O/l$. The pH of the emulsion is set to pH 3.5 with formic acid. The state of the dispersion remains stable.

The test is repeated by using part of the emulsion according to

Comparative Example 1

After pH-adjustment to a value of 3.5, the dispersion breaks down under deposition of a large portion of the colorless, previously dispersed phase.

We claim:

1. An agent for waterproofing leathers and furs, comprising at least one silicone and at least one emulsifier, wherein said at least one emulsifier is selected from the group consisting of alkyl polyalkylol ether carboxylic acids having an HLB value of less than 10, alkylaryl polyalkylol ether carboxylic acids, and alkali, alkaline earth, ammonia, amine or alkanolamine salts of said carboxylic acids.

2. The agent according to claim 1, comprising 10 to 95%-wt. of said silicone and 5 to 90%-wt. of said emulsifier.

3. The agent according to claim 1, wherein the agent is anhydrous.

4. The agent according to claim 1, wherein the agent is aqueous.

5. The agent according to claim 4, wherein the agent is an aqueous emulsion of
   a) 10 to 90%-wt. of silicone,
   b) 0.5 to 70%-wt. of emulsifier,
   c) 0—5%-wt. of a base, and
   d) at least 5%-wt. water or an amount needed to make up 100%-wt., having a pH-value of 4–12.

6. The agent according to claim 4, wherein the agent is an aqueous emulsion of
   a) 10 to 90%-wt. of silicone,
   b) 0.5 to 70%-wt. of emulsifier,
   c) 0–5%-wt. of a base, and
   d) 1–80%-wt. of at least one compound selected from anionic fat-liquors and greases, mineral oils, synthetic ester oils, and natural oils, and
   e) at least 5%-wt. water or an amount needed to make up 100%-wt., having a pH-value of 4 to 12.

7. An agent for waterproofing leathers and furs, comprising at least one silicone and at least one emulsifier, wherein said at least one emulsifier is selected from the group consisting of alkyl polyalkylol ether carboxylic acids, alkylaryl polyalkylol ether carboxylic acids, and alkali, alkaline earth, ammonia, amine or alkanolamine salts of said carboxylic acids; and wherein the alkyl polyalkylol ether carboxylic acid and the alkylaryl polyalkylol ether carboxylic acid correspond to the general formula

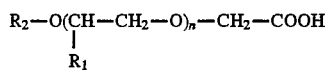

wherein $R_1$ represents H or $CH_3$, $R_2$ represents
an n-alkyl or iso-alkyl residue having 9 to 30 C-atoms, or
an alkylaryl residue or dialkylaryl residue, and n represents a numerical value of 1 to 8.

8. The agent according to claim 7, wherein the n- or iso-alkyl residue has 12 to 22 C-atoms.

9. The agent according to claim 7, wherein the n- or iso-alkyl residue has at least one olefinic group.

10. The agent according to claim 7, wherein the alkylaryl residue or dialkyl residue consists of a dialkylphenyl group having alkyl residues with 6 to 10 C-atoms.

11. The agent according to claim 7, wherein the alkylaryl residue or dialkyl residue consists of a dialkylphenyl group having alkyl residues with 8 or 9 C-atoms.

12. The agent according to claim 7, wherein n is 1.5 to 6.

13. The agent according to claim 7, wherein the emulsifier is an alkali, alkaline earth, ammonia, amine, or alkanolamine salt of an alkyl polyalkylol ether carboxylic acid or an alkylaryl polyalkylol ether carboxylic acid.

14. A process for waterproofing leathers and furs in aqueous liquor, comprising the steps of applying to the leather or fur a waterproofing agent comprising at least one silicone and at least one emulsifier, wherein said at least one emulsifier is selected from the group consisting of alkyl polyalkylol ether carboxylic acids, alkylaryl polyalkylol ether carboxylic acids, and alkali, alkaline earth, ammonia, amine or alkanolamine salts of said carboxylic acids in an aqueous liquor in an amount of 0.1 to 30.0%-wt. relative to a shaved weight of the leathers or to a wet weight of the furs, at a pH-value in the range of 3.5 to 8.0, and waterproofing by milling the leather or fur at a liquor temperature in the range of 10° to 80° C.

15. The process for waterproofing leathers and furs according to claim 14, comprising the further step of adjusting the liquor to a pH-value in the range of 3.0 to 5.0 by adding at least one organic acid or mineral acid.

16. The process according to claim 14, wherein the waterproofing step includes a retanning step.

17. The process according to claim 14, wherein the waterproofing step is done subsequent to a retanning step.

18. The process according to claim 14, wherein the liquor temperature is in the range of 20° to 60° C.

19. The process for waterproofing leathers and furs according to claim 15, wherein the acid is formic acid.

20. The process for waterproofing leathers and furs according to claim 15, comprising the further step of after-treating the leather or fur with metallic salts of di- to tetravalent cations.

21. The process for waterproofing leathers and furs according to claim 20, wherein the cations are selected from the group consisting of chromium, aluminum, zirconium and titanium.

* * * * *